United States Patent [19]

Schmidtmann et al.

[11] Patent Number: 4,984,093

[45] Date of Patent: Jan. 8, 1991

[54] VIDEO RECORDER WITH INCREASED BANDWIDTH RECORDING

[75] Inventors: Burchard Schmidtmann, Villingen; Silvestre Cerda-Davo, Toledo, both of Fed. Rep. of Germany

[73] Assignee: Deutsche Thomson-Brandt GmbH, Villingen-Schwenningen, Fed. Rep. of Germany

[21] Appl. No.: 242,836

[22] Filed: Sep. 12, 1988

[30] Foreign Application Priority Data

Sep. 17, 1987 [DE] Fed. Rep. of Germany ....... 3731166

[51] Int. Cl.⁵ .............................................. H04N 9/83
[52] U.S. Cl. .................................................. 358/330
[58] Field of Search ...................... 358/11, 12, 310, 330

[56] References Cited

U.S. PATENT DOCUMENTS

| | | | |
|---|---|---|---|
| 4,335,393 | 6/1982 | Pearson | 358/310 |
| 4,665,427 | 5/1987 | Beckley et al. | 358/12 |
| 4,730,222 | 3/1988 | Schauffele | 358/330 |
| 4,831,463 | 5/1989 | Faroudja | 358/330 |

FOREIGN PATENT DOCUMENTS

| | | |
|---|---|---|
| 111150 | 6/1984 | European Pat. Off. |
| 162241 | 12/1970 | New Zealand |
| 1058604 | 2/1967 | United Kingdom |

OTHER PUBLICATIONS

*Funkschau*, 11/1987, pp. 8 and 10.
*Nachrichtentechnik*, 2nd Edition, by Karl Steinbuch and Werner Rupprecht, Berlin, Springer-Verlag, 1973, pp. 278-281.
*Funk-Technik*, 1974, No. 1, "Secam-Pal Konverter Mit Automatischer Umschaltung", by M. Schnick, pp. 9-11.

Primary Examiner—Donald McElheny, Jr.
Attorney, Agent, or Firm—Joseph S. Tripoli; Joseph J. Laks; Sammy S. Henig

[57] ABSTRACT

A luminance signal is frequency modulated with an FM carrier to generate a frequency modulated YFM signal having a frequency spectrum within a frequency band of e.g. 1.6 to 8 megahertz. A quadrature modulated PAL color signal is down-converted in a mixer to the empty frequency band below the YFM band and filtered by a Nyquist filter having a Nyquist slope centered on the mixing carrier frequency of e.g. 1 megahertz. The YFM and down-converted color signals are added and then recorded on magnetic tape. The frequency spectrum of the down-converted color signal has a vestigial sideband characteristic that permits the recording of a relatively wideband color signal in the luminance-free free frequency band of e.g. 0-1.2 megahertz.

11 Claims, 2 Drawing Sheets

VIDEO RECORDER WITH INCREASED BANDWIDTH RECORDING

This invention relates to a video recorder with increased bandwidth recording.

BACKGROUND

The luminance signal of a video recorder may be recorded by frequency modulation of a carrier, which may result in a frequency spectrum having, for example, a frequency range of 1.3 to 6 megahertz. During recording, the chrominance signal, which is a modulated color carrier signal, is converted by a mixing carrier to a modified color carrier signal, reduced in carrier frequency to about 627 kilohertz. The down-converted signal is recorded in the free or vacant frequency range below the frequency spectrum of the FM carrier that is modulated with the luminance signal. This vacant frequency range amounts to 1 megahertz, and thus a bandwidth of 0.5 megahertz is available for conventional color signal recording.

An improved recording system is known, such as Super VHS or S-VHS, in which a greater frequency modulation range and a greater total bandwidth of the spectrum is achieved by recording on magnetic tape having improved magnetic film characteristics and by using a greater magnetizing current for the FM carrier. By means of this system, the baseband bandwidth of the recorded luminance signal is increased to about 5 megahertz, and, in addition, the signal-to-noise ratio is increased.

The bandwidth of the recorded color signals remains the same for the S-VHS system, because, for reasons of compatibility, only the vacant frequency range of 0 to 1.2 megahertz below the frequency spectrum of the FM carrier is available for recording the color carrier. This has the disadvantage that the sharpness or definition and the signal-to-noise ratio for the recorded color signals have not been improved.

A feature of the invention, therefore, is to improve the bandwidth of video signals, such as color signals, and thus improve the quality of reproduction in a video recorder, without having to increase the available frequency range outside the frequency band associated with the FM carrier.

SUMMARY OF THE INVENTION

A first video information containing signal is modulated with a carrier to generate a first modulated signal having a first frequency spectrum in a first frequency band. A modulator quadrature modulates second and third signals with a second carrier to generate a second modulated signal having a second frequency spectrum in the form of a vestigial sideband that is located in a second frequency band outside said first frequency band in a region that is generally empty of frequencies belonging to said first modulated signal. The two modulated signals are combined to obtain a third signal having a combined generally nonoverlapping frequency spectrum that represents the aforemention two frequency spectrums.

In accordance with a further inventive aspect, the quadrature modulator generates the second carrier such that the phase of the carrier alternately reverses from period to period in a manner that produces upper and lower sidebands for the second modulated signal that correspondingly and alternately reverse their positions relative to the frequency position of the carrier.

In accordance with a still further aspect of the invention, a luminance containing signal is frequency modulated with an FM carrier to generate a frequency modulated signal having a first frequency spectrum in a first frequency band. A chrominance containing signal is modulated with a second carrier to generate a second modulated signal having a second frequency spectrum in the form of a vestigial sideband that is located in a second frequency band below the first frequency band in a region that is generally empty of frequencies belonging to the frequency modulated signal. The two modulated signals are combined and recorded on a magnetic tape.

Thus, a better reproduction is obtained with respect to sharpness and signal to noise ratio, while still using the limited, vacant frequency range of, e.g., 1.0 megahertz below the frequency spectrum of the FM signal. When recording color signals, compatibility with existing systems is achieved, in that, as before, color signals are recorded in the same limited frequency range of 1 megahertz.

In known recorders, the color carrier is recorded with two sidebands centered in the vacant frequency range, so that only half the width of the frequency range, that is 0.5 megahertz, is available for the baseband color bandwidth. By using the inventive vestigial sideband modulation techniques, the entire width of the vacant frequency range is utilized by the baseband color signal.

The vestigial sideband method may, in certain circumstances present crosstalk problems if quadrature modulation of the carrier is attempted. However, with a PAL color carrier this potential problem does not occur, for the following reasons: The phase modulation direction of the PAL color carrier is reversed every second line scan. As may be proven theoretically, this reversal means that the other sideband is simulated.

During recording, the PAL color carrier has the following PAL burst phases:
+135° in odd-numbered lines of the 1st and 2nd frame;
−135° in even-numbered lines of the 1st and 2nd frame;
+135° in even-numbered lines of the 3rd and 4th frame;
−135° in odd-numbered lies of the 3rd and 4th frame.

The positive phase modulation direction, +135°, and the negative phase modulation direction, −135°, represent, alternately from line to line, the lower and upper sidebands, even, if in fact, only one sideband is transmitted. In the PAL decoder there now takes place an averaging of the color carrier from two time-sequential lines. This averaging again produces signals having the frequency of the color carrier, whereby the absent sideband is simulated and single sideband errors are for the most part compensated. This type of effect on single sideband error during quadrature modulation when using a PAL running-time decoder is described in German DEPS No. 1187672, corresponding to U.K. Patent Specification 1058604.

In accordance with another aspect of the invention, the frequency of the down-converted color carrier lies in the vicinity of 1.0 megahertz at the upper end of the vacant frequency range. In carrying out this aspect of the invention during recording and/or reproduction, a filter is coupled in the path of the down-converted color carrier, which has a Nyquist slope having a decay of 6 dB centered at the frequency of the down-converted color carrier.

In the color processing path, there is one or more additions of the color carrier from two lines, and hence a time delay occurs. It may therefore be useful to time-shift the luminance signal relative to the color signals by means of luminance delay of one or two lines. This ensures that time correlation of the color signals with the luminance signal is maintained, without producing a relative shift of the display of these signals in the vertical direction of the picture.

DETAILED DESCRIPTION OF THE INVENTION

Figure 1:
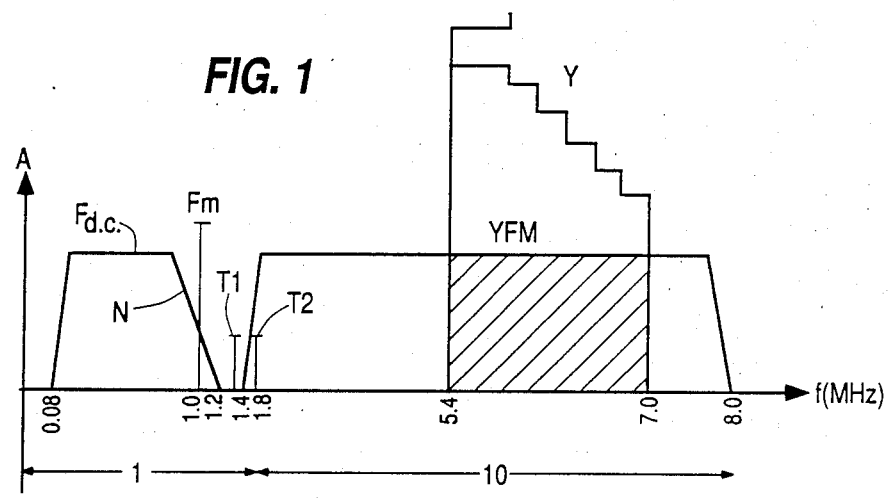
FIG. 1 illustrates a frequency spectrum of a video tape recorded signal in accordance with the invention.

In FIG. 1, a luminance signal Y is recorded by frequency modulation of an FM carrier. The frequency modulated signal YFM has a deviation that extends from 5.4 megahertz for sync tip level of the luminance signal to 7.0 megahertz for peak white level. For the signal YFM this means a total spectrum 10 extending from 1.6 megahertz to 8 megahertz, taking into account luminance channel filtering and magnetic tape frequency response. Below frequency spectrum 10 there is a vacant or empty frequency range 1 of 0 to 1.2 megahertz.

In accordance with an inventive feature, a down-converted PAL color signal $F_{d.c.}$, quadrature-modulated with two chrominance or color difference signals, is recorded in frequency band 1. The down-converted color carrier Fm is located near 1.0 megahertz. In accordance with a further inventive feature, during recording and/or reproduction, a filter is inserted in the path of the down-converted, modulated color signal $F_{d.c.}$. The filter has a Nyquist slope N with a decay of 6 dB in the center.

The resultant frequency spectrum of color signal $F_{d.c.}$ is illustrated by the spectrum in frequency range 1 of FIG. 1. It is evident that the lower sideband of the modulated color carrier $F_{d.c.}$ extends over 1.0 megahertz, enabling each of the two color difference signals to have an increased bandwidth of 1.0 megahertz. Between the modulated color carrier signal $F_{d.c.}$ and signal YFM there are recorded, e.g. by means of depth multiplexing, two sound carriers T1,T2 having the frequencies 1.4 and 1.8 megahertz, respectively. The two sound carriers are modulated in a conventional manner with two sound signals from different sources or with the stereo components of a sound signal, if a stereo sound signal is to be recorded.

Figure 2:
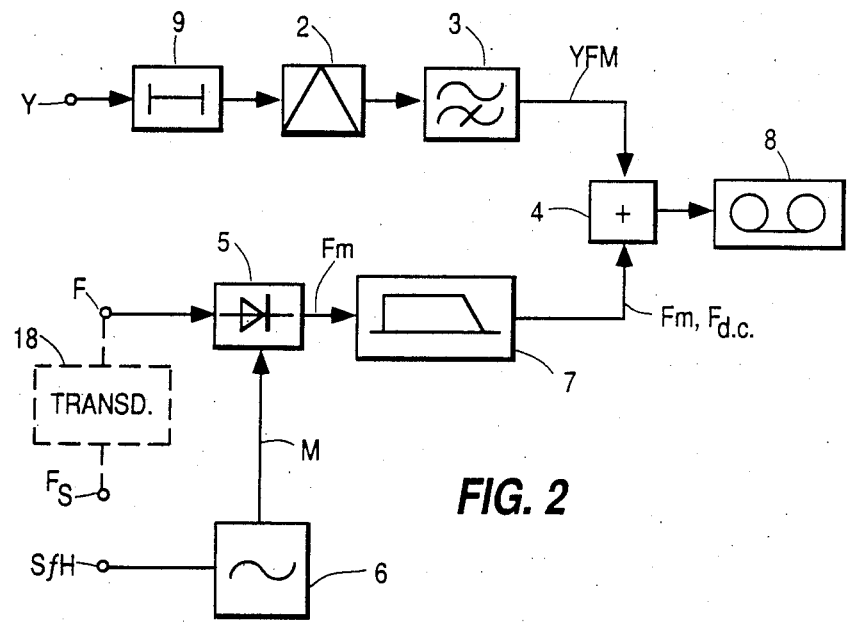
FIG. 2 illustrates in block diagram form a recording system embodying the invention.

FIG. 2 illustrates a video recording system embodying the invention, that produces the recorded video frequency spectrum of FIG. 1. In FIG. 2, luminance signal Y is delayed by a line delay 9 and then modulated upon an FM carrier in an FM modulator 2. Line delay 9 provides at least a 1 line delay of luminance signal Y to provide better line-to-line time correlation between processed luminance and chrominance signals to be recorded for ultimate display in a television receiver. Alternatively, a line delay may be inserted in the luminance channel after FM modulation. The output of FM modulator 2 is coupled to an adding stage 4 via a high-pass filter 3, having a cutoff frequency of 1.6 megahertz.

A conventionally modulated PAL color carrier signal F, having a carrier frequency of 4.43 megahertz, is down-converted in a mixing stage 5 with a mixing carrier M of frequency 3.4 megahertz. Mixing carrier M is generated by an oscillator 6. At the output of mixing stage 5 there is generated a frequency down-converted, modulated color signal, having a carrier Fm with a frequency of 1.0 megahertz.

PAL color signal F may be derived from a conventional PAL encoder (having an increased baseband bandwidth of more than 1.2 megahertz, rather than 0.5 megahertz). Alternatively, signal F may be obtained from a transcoder 18 that transcodes a conventionally formatted SECAM signal $F_S$ into the PAL formatted signal F.

The down-converted, modulated color signal arrives at adding stage 4 via a filter 7 having a Nyquist slope N, centered at 1.0 megahertz. The frequency of mixing carrier M is $(m/n)fH$, where m and n are whole numbers and fH is the line scanning frequency of luminance signal Y. A synchronizing signal SfH, conventionally derived, synchronizes oscillator 6 to line frequency fH.

The output signal of adding stage 4, which combines luminance signal YFM with the down-converted quadrature-modulated color signal $F_{d.c.}$, is coupled to the recording stage of a video recorder 8, for recording therein in a conventional manner.

Figure 3:
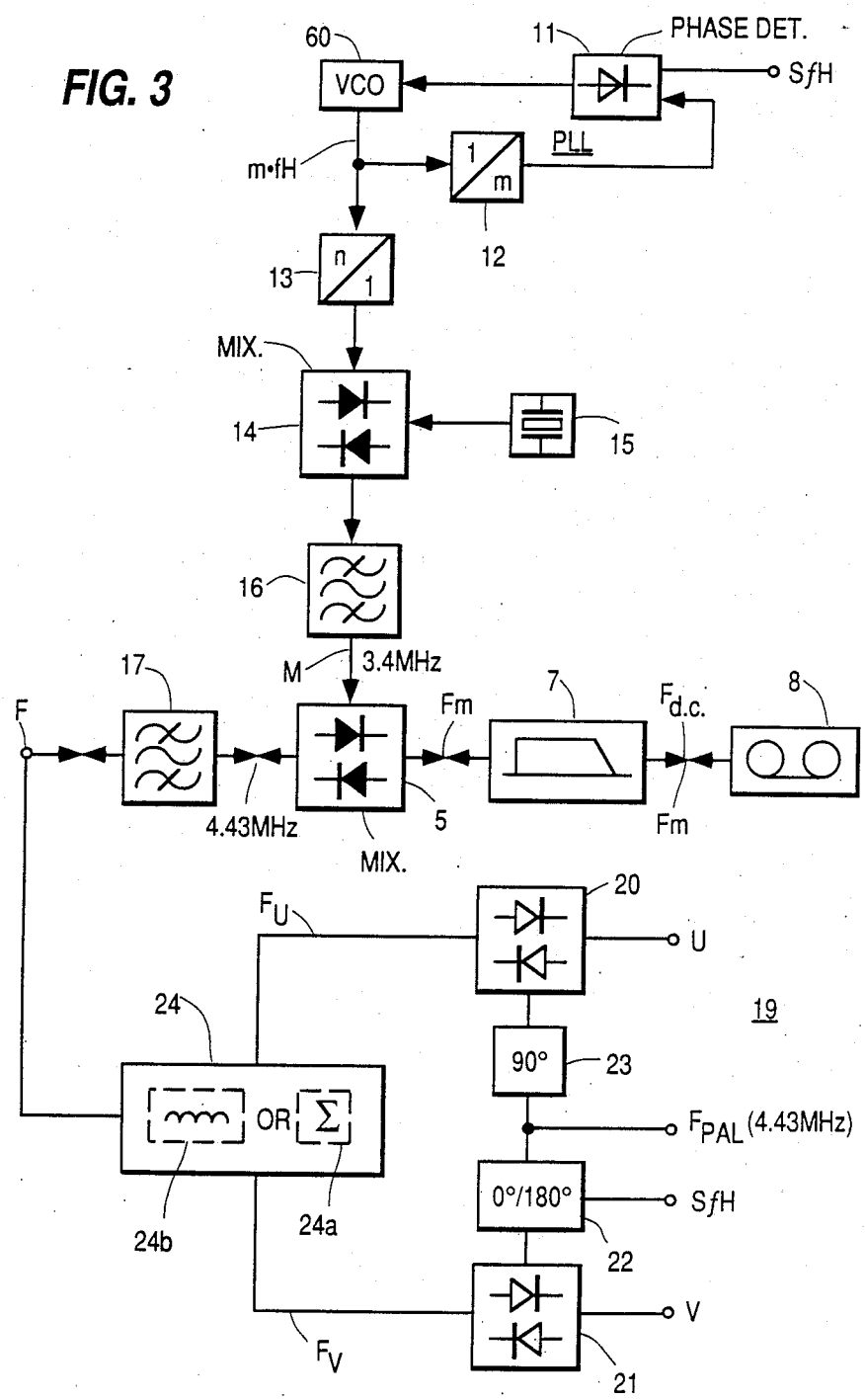
FIG. 3 illustrates in block diagram form the processing of the color carrier during recording and reproduction, in accordance with the invention.

FIG. 3 illustrates an embodiment of the color circuit for preparing the color processing channel for recording and reproduction, where, for the sake of simplicity, the luminance signal processing channel has been omitted. In FIG. 3, a PLL circuit comprises a VCO oscillator 60, a phase comparison stage 11 and a frequency divider 12 of divisor m. Phase comparison stage 11 compares the divided output of oscillator 60 with synchronizing signal SfH for synchronizing oscillator 60 to signal SfH. The frequency of oscillator 60 is m times the frequency fH. The output of oscillator 60 is divided by a frequency divider 13 of divisor n and is then coupled to an input of a mixing stage 14.

Mixing stage 14 generates mixing carrier M of frequency 3.4 megahertz, which is coupled via a band-pass filter 16 to an input of mixing stage 5. At another input of mixing stage 5, there is coupled, via a band-pass filter 17, a quadrature modulated, conventionally formatted PAL color signal F of a standard PAL color carrier frequency of 4.43 megahertz.

PAL color signal F is generated by a PAL encoder/decoder 19 operating in the encoder mode. The baseband U and V signals are modulated in modulators 20 and 21 in quadrature relationship to each other by a PAL color carrier $F_{PAL}$ to generate quadrature modulated signals $F_U$ and $F_V$. Modulated signals $F_U$ and $F_V$ are coupled to a stage 24, which in the encoder configuration comprises a summer 24a, to generate modulated PAL color signal F.

PAL carrier $F_{PAL}$ is coupled to modulator 20 via a 90° phase shifter 23 and is coupled to modulator 21 via a phase reversal switch 22. Phase reversal switch 22 reverses the phases of PAL color carrier $F_{PAL}$ from period-to-period, e.g. from line-to-line, to produce the conventionally formatted and modulated PAL color signal F. The carrier phase reversal in effect produces upper and lower sidebands for signal F which correspondingly and alternately reverse their positions relative to the frequency position of PAL carrier $F_{PAL}$.

Mixing stage 5 generates a down-converted, modulated color signal, with a carrier frequency Fm of 1.03 megahertz. The down-converted, modulated color signal is filtered by filter 7 having a Nyquist slope N, as described earlier with respect to filter 7 of FIG. 2. Mixing carrier M is not modulated, but is coupled with line frequency synchronizing signal SfH to generate a carrier signal M that is a whole integer multiple of the line frequency. The filtered color signal $F_{d.c.}$, at the output of filter 7, is coupled to the recording stage of a video recorder 8, for recording therein in a conventional manner.

During reproduction, the circuit of FIG. 3 operates in the reverse direction. The modulated color signal $F_{d.c.}$, derived from the playback circuitry of recorder 8, is up-converted by mixing with mixing carrier M in mixing stage 5. After filtering, a conventionally formatted and modulated PAL color signal F with a carrier frequency of 4.43 megahertz, is generated.

During playback, the PLL circuit of FIG. 3 synchronizes mixing carrier M with the line frequency synchronizing signal SfH. Synchronizing signal SfH is conventionally derived from the playback processing circuitry of the luminance channel, not illustrated in FIG. 3. Thus, mixing carrier M follows the speed fluctuations of the tape and follows other timebase errors introduced into down-converted color carrier Fm. Mixing stage 5, therefore, simultaneously provides timebase error correction of PAL color signal F when carrier signal M is mixed with the down-converted color signal $F_{d.c.}$. The generation of a mixing carrier M, which serves to compensate for timebase errors, in accordance with the playback line frequency synchronizing signal SfH, is described in detail in German DEPS No. 2008956.

If it is desired to further process PAL color signal F into its baseband U and V components, PAL encoder/decoder 19 operates in the decoder mode. Stage 24, rather than comprising a summer 24a, comprises a conventional comb filter 24b, which separates out modulated signals $F_U$ and $F_V$. These signals are coupled to stages 20 and 21 which are now configured as demodulators rather than modulators to generate at their respective outputs signal U and V. In the decoder configuration, 90° phase shifter 23 is not needed and color carrier $F_{PAL}$ is passed through to demodulator 20 without phase shift.

What is claimed is:

1. Video recording apparatus, comprising:
   a source of a luminance containing signal;
   means for frequency modulating said luminance containing signal with an FM carrier to generate a frequency modulated signal having a first frequency spectrum in a first frequency band;
   a source of a chrominance containing signal;
   means including a modulator for modulating said chrominance containing signal with a second carrier to generate a second modulated signal having a second frequency spectrum that is located in a second frequency band below said first frequency band in a region that is generally empty of frequencies belonging to said frequency modulated signal, said second frequency spectrum including a band of upper sidebands and a band of lower sidebands with respect to said second carrier frequency having a corresponding pair of upper and lower cut-off frequencies such that one of said upper and lower cut-off frequencies is substantially closer to said second carrier frequency than the other one; and
   means for combination and recording said frequency and second modulated signals on a magnetic tape.

2. Apparatus according to claim 1 wherein said second modulated signal generating means includes a filter coupled to an output of said modulator, said filter having associated therewith a Nyquist slope centered near the frequency of said second carrier.

3. Apparatus according to claim 1 wherein said second carrier has a frequency near 1 megahertz.

4. Apparatus according to claim 1 wherein said chrominance containing signal comprises a PAL formatted chrominance signal that is frequency translated to said second frequency band.

5. Apparatus according to claim 4 wherein said modulator comprises a mixer having a mixing carrier frequency near 3.4 megahertz.

6. Apparatus according to claim 4 wherein said PAL chrominance signal includes two color-difference signals quadrature modulated with a PAL color carrier.

7. Apparatus according to claim 1 including time-shifting means responsive to at least one of said luminance and chrominance containing signals for generating said frequency modulated signal time shifted by at least one scanning line relative to said second carrier modulated signal.

8. Apparatus according to claim 1 wherein said source of chrominance containing signal comprises a source of a SECAM formatted chrominance signal coupled to a transcoder that transcodes said SECAM formatted signal to a PAL formatted chrominance signal, said PAL formatted signal comprising said chrominance containing signal.

9. Video recording apparatus, comprising:
   a source of a first video information containing signal;
   means for frequency modulating said first video information containing signal with an FM carrier to generate a frequency modulated signal having a first frequency spectrum in a first frequency band;
   a source of a second video information containing signal;
   means including a modulator for modulating said second video information containing signal with a second carrier to generate a second modulated signal having a second frequency spectrum that is located in a second frequency band outside said first frequency band in a region that is generally empty of frequencies belonging to said frequency modulated signal, said second frequency spectrum including a band of upper sidebands and a band of lower sidebands with respect to said second carrier frequency having a corresponding pair of upper and lower cut-off frequencies such that one of said upper and lower cut-off frequencies is substantially closer to said second carrier frequency than the other one; and
   means for combination and recording said frequency and second modulated signals on a magnetic tape.

10. Apparatus, comprising:
    a source of a first video information containing signal;
    means for modulation said first video information containing signal with a carrier to generate a first modulated signal having a first frequency spectrum in a first frequency band;
    a source of second and third signals;
    means including a modulator for quadrature modulating said second and third signals with a second carrier to generate a second modulated signal having a second frequency spectrum that is located in a second frequency band outside said first frequency band in a region that is generally empty of frequencies belonging to said first modulated signal, said second frequency spectrum including a band of upper sidebands and a band of lower sidebands with respect to said second carrier frequency having a corresponding pair of upper and lower cut-off frequencies such that one of said upper and lower cut-off frequencies is substantially closer to said second carrier frequency than the other one; and means for combining the two modulated signals to obtain a third signal having a combined generally nonoverlapping frequency spectrum that represents the aforementioned two frequency spectrums.

11. Apparatus according to claim 10 wherein said quadrature modulating means includes means for generating said second carrier such that the phase of said second carrier alternately reverses from period to period in a manner that produces upper and lower sidebands for said second modulated signal that correspondingly and alternately reverse their positions relative to the frequency position of said second carrier, and means for processing said second modulated signal to provide said second frequency spectrum in the form of said vestigial sideband.

* * * * *